May 7, 1929. N. A. CHRISTENSEN 1,711,919

PISTON SEALING MEANS

Filed Feb. 19, 1927

INVENTOR.

Niels A. Christensen

BY

ATTORNEY'S.

Quarles & French

Patented May 7, 1929.

1,711,919

UNITED STATES PATENT OFFICE.

NIELS A. CHRISTENSEN, OF CLEVELAND, OHIO.

PISTON-SEALING MEANS.

Application filed February 19, 1927. Serial No. 169,565.

The invention relates to piston packing.

The object of the invention is to provide a piston packing of the type wherein a thin metal cup engages at its sides against the cylinder wall to form an obturator preventing the escape of pressure fluid from the pressure chamber past the piston.

In devices of this character it has been found that the variance in the thickness of the wall of the cup and the slight inaccuracies of the cylinder bore make it a very difficult matter to obtain an efficient seal and prevents the manufacture of devices of this kind upon a quantity production basis. It has been proposed to spread or expand the sides of the cup against the sides of the cylinder wall by a solid member in spring-pressed engagement with the cup and in my prior application Serial No. 130,438, filed August 20, 1926, I have shown a piston ring for this purpose. However, such devices have not proved entirely satisfactory because of their inability to engage the entire cup area and compensate for production inequalities and the inequalities of the cylinder wall. The object of this invention is to associate with the metal cup a spring of relatively small diameter having its coils extending in the plane of the vertical axis of the cylinder, and more particularly to mount this coil upon an expansible ring member formed of a plurality of sections that are spring-pressed outwardly thereby bringing the light spring into the most effective cooperative relationship with the sides of the cup to insure its efficient sealing engagement with the cylinder in which the piston works.

The invention further consists in the several features hereinafter set forth and more particularly defined by claims at the conclusion hereof.

In the drawings Fig. 1 is a vertical sectional view through a cylinder having its piston equipped with a packing construction embodying the invention;

Figure 1:
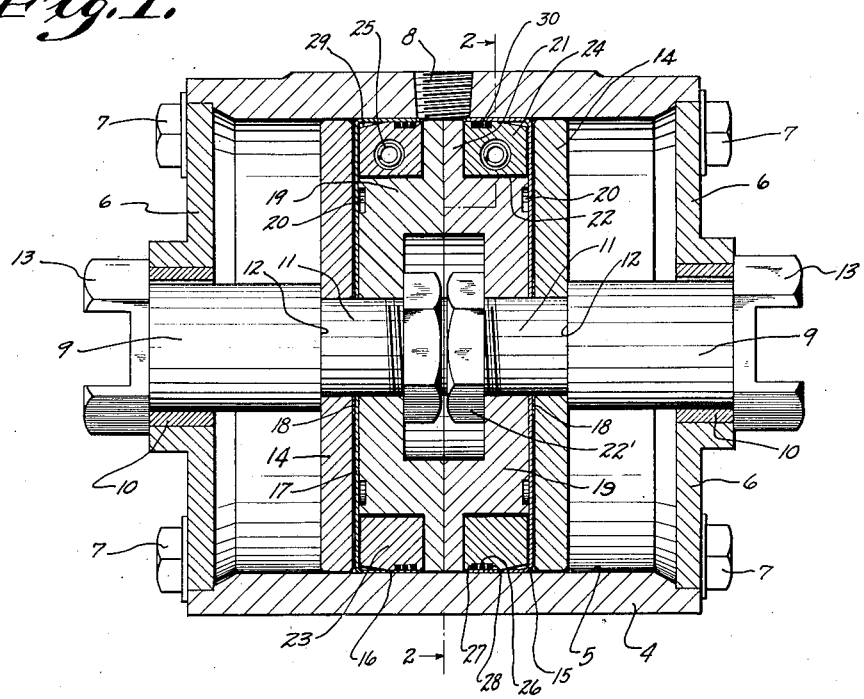
Figure 2:
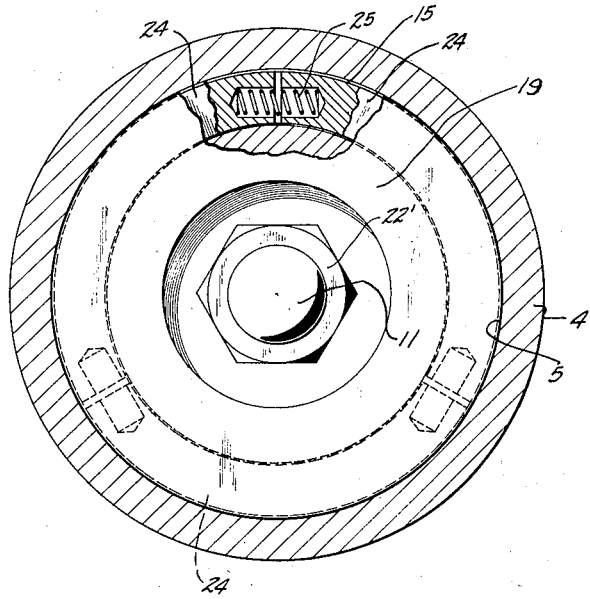
Fig. 2 is a detail sectional view taken on the line 2—2 of Fig. 1.
Figure 3:
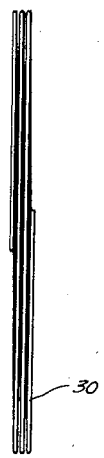
Fig. 3 is a detail side elevation view of the cup-expanding spring.

Referring to the drawings, the numeral 4 designates the main body of the cylinder in which the piston works having a bore 5 and here shown as a brake cylinder closed at its ends by covers 6 detachably secured thereto by bolts 7.

As shown, a pair of pistons work in said bore 5 and move outwardly in opposite directions under the action of pressure fluid introduced into said cylinder between the pistons by way of a port 8 connected with a suitable source of supply.

Each piston includes a piston-rod 9 slidably mounted in a guide bushing 10 in one of the covers 6 and having a reduced threaded end 11, a shoulder 12 and an exterior head 13. A piston head 14 in the form of a metal disk fits over the reduced end 11 and abuts against the shoulder 12.

The piston packing construction includes a thin, flexible and somewhat resilient metal cup 15 having an annular flange portion 16 engaging the bore 4 and a flat disk portion 17 abutting against the head 14 and fitting over the end 11 of the rod 9 or abutting against a thin fibre disk or washer 18 interposed between said head and the central portion of the cup. The cup is firmly clamped to the head by a follower in the form of an annular plate 19 whose central opening fits over the threaded end 11 of the rod 9 so that the cup being clamped at its central portion by means of a nut 22' between the plate 19 and the head 14 or the washer 18 abutting against said head serves as a gasket to prevent the escape of pressure fluid along the rod 11 past the head 14. This plate engages the greater portion of the diameter of the cup though it may be recessed, as at 20, and it has a laterally-extending annular flange portion 21 whose periphery is in close relation with the wall of the bore. The plate 19 in addition to acting as a clamp for the cup 15 also cooperates with the plate or head 14 to form an annular space 22 and also acts as a filler to reduce the clearance space in the pressure-chamber so that the piston will respond quickly to differences in pressure existing in the pressure-chamber which, in the form shown, is between the pistons. A nut 22' mounted within a central recess in the plate 19 engages the threaded end 11 of the rod and serves to clamp said plates and cup between it and the shoulder.

A ring 23 is mounted within the space 22 and while it may be made in one piece, for best results I prefer to form it of a plurality of sections, preferably three sections, 24 with a compression spring 25 mounted in bores in adjoining sections and serving to expand these sections outwardly into engagement with the sides of the cup. The ring is somewhat narrower than the width of the space 22 so that there is slight clearance between the sides of this ring and the sides of the annular space 22 formed by the head 14 and the flange 21 and the bottom of the cup so that there is a free movement of this ring to follow the cup and cylinder wall. The ring 23 is provided with an annular groove 26 with small bearing areas 27 and 28 on each side and a tapered rear portion 29 adjacent the bend formed between the side and bottom walls of the cup. This ring with the sections contracted or as a single ring is slightly smaller in diameter than the inside diameter of the cup.

A spring 30 of relatively larger diameter than the inside of the cup and of small diameter wire and of few coils, for example, two or three, and of a wire diameter substantially equal to the depth of the groove 26 is mounted therein. There is a slight clearance between the sides of the coil and the sides of the groove 26.

When the wire coil 30 is put in place on the ring and the piston inserted into the cylinder it forms, because of the slight pitch of the coils and the small diameter of the wire, substantially a circle contacting with the cup and when assembled with the ring, cup and piston and inserted within the cylinder makes the sides of the cup, opposite to which it engages, follow the cylinder wall, allowing for production variations both in roundness and parallelism of the cylinder bore, slight differences in cylinder diameter, cup wall thickness and any wear that may occur, and counteracts the tendency of the contraction of the sides of the cup so that the cup is maintained in efficient sealing engagement with the wall of the cylinder bore at all times so that leakage between the bore and cup is effectively prevented. Where the ring 23 is made up of expansible sections the coil 30 is free to expand and contract circumferentially by sliding in its groove and is continually pressed outwardly against the cup wall by the sections 24 through the spring 25.

Where the ring 23 is formed in one piece the expansive action of the coil 30 alone is relied upon to keep the sides of the cup against the bore in which it works.

It will, of course, be understood that with either of these constructions the whole width of the side of the cup is not entirely in contact with the cylinder wall but that substantially only that portion of the cup against which the coil 30 is acting is in contact at all times though where the pressure fluid is introduced into the cylinder it will act upon the sides of the cup to secure a greater contact and thus a further sealing area as the piston or pistons move outwardly under the action of this fluid.

I desire it to be understood that this invention is not to be limited to any particular form or arrangement of parts except in so far as such limitations are included in the claims or necessitated by the prior art.

What I claim as my invention is:

1. In a piston packing, the combination with a piston, of a thin metal cup secured thereto and having its side wall adapted to engage the bore of the cylinder in which the piston works, a ring mounted within the cup and provided with a groove, and a coiled spring of a diameter substantially the same as the depth of said groove engageable with the side wall of the cup over a limited area and free to expand and contract lengthwise in said groove and exerting pressure against the side wall of the cup to maintain it in sealing engagement with the bore of the cylinder.

2. In a piston packing, the combination with a piston, of a thin metal cup secured thereto and having its side wall adapted to engage the bore of the cylinder in which the piston works, an expansible ring mounted within the cup and provided with a peripheral groove adjacent the side wall of the cup, means permitting a limited sliding movement of said ring relative to said piston, and a coiled spring of a diameter substantially the same as the depth of said groove and free to expand and contract lengthwise in said groove and exerting pressure against the side wall of the cup to maintain it in sealing engagement with the bore of the cylinder.

3. In a piston packing, the combination with a piston, of a thin metal cup secured thereto and having its side wall adapted to engage the bore of the cylinder in which the piston works, a sectional ring, with spring means between the sections forming an expansible ring, mounted within the cup and provided with a peripheral groove adjacent the side wall of the cup, and a coiled spring having its coils extending in the direction of the vertical axis of the piston and of a diameter substantially equal to the depth of said groove, the peripheral portions of each of the coils being engageable with the side wall of the cup over a limited area, said spring being free to expand and contract lengthwise in said groove and exerting pressure against the side wall of the cup to maintain it in sealing engagement with the bore of said cylinder.

4. In a piston, the combination of a piston-rod, a pair of plates secured thereto and having an annular space formed between them, a ring disposed in said space and having limited lengthwise movement therein, a thin metal cup secured between said plates, said ring being mounted within said cup and having a peripheral groove, and a coiled spring having its coils extending substantially in the direction of the vertical axis of the cylinder mounted in said groove and exerting pressure against the side wall of said cup over a limited area to maintain this portion of the cup in sealing engagement with the bore of the cylinder in which the piston works.

5. In a piston packing, the combination of a piston-rod, a pair of plates secured thereto and having an annular space formed between them, a sectional ring disposed in said space, springs between the sections of said ring serving to expand said sections outwardly, a thin metal cup secured between said plates, said ring being mounted within said cup and having a peripheral groove, and a spring of few coils, with its coils arranged transversely of said piston, mounted in said groove and exerting pressure against the side wall of said cup over a limited area to maintain this portion of the cup in sealing engagement with the bore of the cylinder in which the piston works, said last-named spring being free to contract or expand lengthwise in said groove upon the expansion or contraction of said ring.

6. In a piston packing, the combination with a piston, of a thin metal cup secured thereto and having its side wall adapted to engage the bore of the cylinder in which the piston works, means for expanding the sides of said cup against said bore, and yielding means interposed between said expanding means and the sides of the cup and engaging the entire cylindrical surface of the inner side of the cup over a limited area for effecting an efficient sealing engagement between said cup and bore.

7. In a piston packing, the combination with a piston, of a thin metal cup secured thereto and having its side wall adapted to engage the bore of the cylinder in which the piston works, a coiled spring having its coils concentric with and engaging the side walls of the cup, and means for holding said spring in engagement with the inner side wall of the cup.

8. In a piston packing, the combination with a piston, of a thin metal cup secured thereto and having its side wall adapted to engage the bore of the cylinder in which the piston works, a coiled spring having its coils concentric with and engaging the side walls of the cup, and expansible means for holding said spring in engagement with the inner side wall of the cup.

9. In a piston, the combination of a piston rod, a pair of plates secured thereto and having an annular space formed between them, a ring disposed in said space and having a limited lengthwise movement therein, a thin metal cup secured between said plates, said ring being mounted within said cup and having a groove and a spring mounted in said groove and exercising pressure against the side wall of said cup to maintain the cup in sealing engagement with the bore of the cylinder in which the piston works.

In testimony whereof, I affix my signature.

NIELS A. CHRISTENSEN.